(12) United States Patent  (10) Patent No.: US 9,088,304 B2
Leutgeb et al.  (45) Date of Patent: Jul. 21, 2015

(54) INTERFACE DEACTIVATION FOR COMMUNICATION BETWEEN ELECTRONIC APPLIANCES

(71) Applicant: Infineon Technologies AG, Neubiberg (DE)

(72) Inventors: Thomas Leutgeb, Lieboch (AT); Walter Kargl, Graz (AT); Josef Riegebauer, Ilz (AT)

(73) Assignee: Infineon Technologies AG, Neubiberg (DE)

( * ) Notice: Subject to any disclaimer, the term of this patent is extended or adjusted under 35 U.S.C. 154(b) by 206 days.

(21) Appl. No.: 13/847,786

(22) Filed: Mar. 20, 2013

(65) Prior Publication Data

US 2013/0252544 A1  Sep. 26, 2013

(30) Foreign Application Priority Data

Mar. 21, 2012 (DE) .......................... 10 2012 102 382

(51) Int. Cl.
 *H04B 5/00* (2006.01)
(52) U.S. Cl.
 CPC .................................. *H04B 5/0031* (2013.01)
(58) Field of Classification Search
 USPC ................ 455/41.1, 41.2, 558; 235/492, 493; 340/10.1
 See application file for complete search history.

(56) References Cited

U.S. PATENT DOCUMENTS

| 2009/0127345 | A1* | 5/2009 | Chamley et al. | 235/492 |
| 2009/0247078 | A1 | 10/2009 | Sklovsky et al. | |
| 2010/0056053 | A1* | 3/2010 | Breitfuss et al. | 455/41.2 |
| 2012/0094603 | A1* | 4/2012 | Hoeksel et al. | 455/41.2 |
| 2012/0178366 | A1* | 7/2012 | Levy et al. | 455/41.1 |

FOREIGN PATENT DOCUMENTS

| CN | 101465674 A | 6/2009 |
| CN | 102047223 A | 5/2011 |
| CN | 102047748 A | 5/2011 |
| EP | 2405378 A1 | 1/2012 |
| KR | 101073937 B1 | 10/2011 |

* cited by examiner

*Primary Examiner* — Nguyen Vo
(74) *Attorney, Agent, or Firm* — Murphy, Bilak & Homiller, PLLC

(57) ABSTRACT

A method for controlling the flow of data in a near field communication appliance having an interposed element and a plurality of secure elements is disclosed. The method includes: receiving a first communication, sent by an external appliance, which is intended for an application located in one of the secure elements; determining whether a first one of the secure elements contains the application; and deactivating an interface from the interposed element to the first secure element if the first secure element does not contain the application. Corresponding systems and appliances for near field communication are also disclosed.

19 Claims, 6 Drawing Sheets

INTERFACE DEACTIVATION FOR COMMUNICATION BETWEEN ELECTRONIC APPLIANCES

PRIORITY CLAIM

This application claims priority to German Patent Application No. 10 2012 102 382.4, filed on 21 Mar. 2012, the content of said German application incorporated herein by reference in its entirety.

TECHNICAL FIELD

The invention relates to communication methods between electronic appliances, and particularly to the control of communication within an appliance which is used for near field communication, specifically in the 13.56 MHz band, and to appliances with accordingly controlled communication.

BACKGROUND

Mobile electronic appliances are increasingly equipped with additional radio frequency (RF) communication functions. By way of example, this relates to mobile telephones, portable media players, smartphones, personal digital assistants (PDAs), handheld games consoles, tablet computers, laptop computers, etc. Besides their conventional functions, these appliances will thus be capable of performing additional communication functions. The range of applications for RF communication functions includes, in particular, contactless chip card functions, such as bookings, payments, purchases and the like, but also simple terminal-to-terminal communication initiated by the user, for example for the exchange of photographs, MP3 songs or business cards. Such additional RF communication functions are increasingly being implemented using what is known as near field communication (NFC) engineering.

NFC engineering is a wireless short range connectivity technique which allows simple and secure two-way interactions between electronic appliances. This allows consumers to perform contactless transactions, access digital contents and connect electronic appliances or apparatuses. In other words, NFC engineering allows contactless, bidirectional communication between appliances. These elements may be mobile telephones, computers, consumer electronics, cards, tags, signs, posters, washing machines and the like which are equipped with NFC. An appliance equipped with NFC engineering can basically operate in a read/write, peer-to-peer or card emulation mode.

NFC engineering is standardized as a contactless technique in the 13.56 MHz frequency band. The ISO 14443 standard is a basic building block for a large part of the near field operations. NFC engineering is generally compatible with at least the type A and type B ISO 14443 standards. The components of an NFC session comprise initiators and targets. The initiator is the element which starts and manages the communication and the interchange of data. The target responds to requests from the initiator. A feature of NFC engineering is that elements can act either as an initiator or as a target. NFC engineering requires a dedicated RF chipset and an antenna to be integrated in the mobile element.

In a known configuration, the ISO 14443 standard is mapped in a mobile terminal onto a contact-based, transparent interface between, by way of example, an NFC frontend and a secure element, the secure element being able to be in the form of a smart card, for example. When physical proximity between the terminal and a contactless external terminal is set up, for example in order to make an electronic payment, RF communication is used to set up communication between the terminal and the mobile terminal. Based on the ISO 14443 standard, the communication between the wireless terminal and the secure element on which an application for handling the payment transaction is hosted is usually transparent in this case. This means that the NFC frontend as an interposed element passes the data stream through between the secure element (SE) and the external wireless terminal in both communication directions almost without alteration. In this case, mere decoding is not regarded as a break in the transparency so long as the transported information is not altered. This transparency is advantageous because, inter alia, it increases the communication speed as a result of absent intermediate steps in the NFC frontend, and also the security of the overall process.

It is to be expected that commercially available terminals, such as mobile telephones, will each increasingly be equipped with multiple secure elements, or at least the option of using multiple elements, in a foreseeable time. The reason for this, inter alia, is that there has been no internationally recognized industrial standard to date which provides a standard format for a secure element for the different market players in the area of near field communication. By way of example, these include manufacturers of mobile terminals such as mobile telephones and tablet computers, etc., mobile radio providers, providers of payment systems, etc. The individual players have different channels and options for bringing the hardware of their payment systems to the customer. In the case of a mobile telephone manufacturer, this may be, by way of example, the installation of a complete near field communication system, including an NFC frontend and a permanently installed, i.e. soldered, for example, secure element. By contrast, the mobile radio provider is usually totally unable, or has only very limited ability, to influence the hardware of the terminal and will therefore provide a secure element, for example, in the form of or as a combination with a SIM card, which, as known from conventional mobile radio technology, the end user inserts into his mobile telephone, e.g. instead of his conventional previous SIM card without a secure element. A further option is a secure element in the form of a chip card (smart card) or SD card, for example, which is inserted into a card slot in the terminal, that is to say in the mobile telephone, handheld computer or tablet computer, for example.

ISO standard 14443 defines the communication between a secure element and an NFC frontend. One way of providing, by way of example, a plurality of payment systems in a mobile terminal with near field communication capability, such as a mobile telephone, is to provide the relevant applications associated with the different payment systems on the same secure element (multi-application secure element). However, this provides only little flexibility insofar as, by way of example, the provider of a payment system may first need to come to an agreement with that market player which controls access to the secure element of the relevant terminal, for example a mobile radio provider in the case of a SIM card. Depending on the market structure and competition circumstances, this may turn out to be uneconomical, complicated or ultimately impossible for the provider of a payment system. Technical incompatibilities between the relevant applications and certain types of secure elements may be a further technical and economic obstacle.

Against this background, there is a need for methods and apparatuses which allow different applications for near field communication to be implemented in a terminal without being reliant on access to a particular secure element.

SUMMARY

In a first exemplary embodiment, the invention relates to a method for controlling the flow of data in a near field communication appliance having a plurality of secure elements. The method comprises: receiving a first communication, sent by an external appliance, which is intended for an application located in one of the secure elements; determining whether a first one of the secure elements contains the application; and deactivating an interface from the interposed element to the first secure element if the first secure element does not contain the application.

In a further exemplary embodiment, the invention relates to a near field communication system that includes a near field communication appliance comprising a plurality of secure elements and an interposed element connected to the secure elements. The near field communication appliance is operable to receive a first communication, sent by an external appliance, which is intended for an application located in one of the secure elements. The near field communication appliance is also operable to determine whether a first one of the secure elements contains the addressed application, and deactivate an interface from the interposed element to the first secure element if the first secure element does not contain the addressed application.

In a further exemplary embodiment, the invention relates to a method for controlling the flow of data in a near field communication appliance having an interposed element and a plurality of secure elements. The method comprises: receiving a first communication, sent by an external appliance, which is intended for an application located in one of the secure elements; determining which one of the secure elements contains the application; and ensuring that further communication takes place exclusively between the external appliance and the secure element which contains the application.

Those skilled in the art will recognize additional features and advantages upon reading the following detailed description, and upon viewing the accompanying drawings.

BRIEF DESCRIPTION OF THE DRAWINGS

The components in the figures are not necessarily to scale, emphasis instead being placed upon illustrating the principles of the invention. Moreover, in the figures, like reference numerals designate corresponding parts. In the drawings.

DETAILED DESCRIPTION

Figure 1:
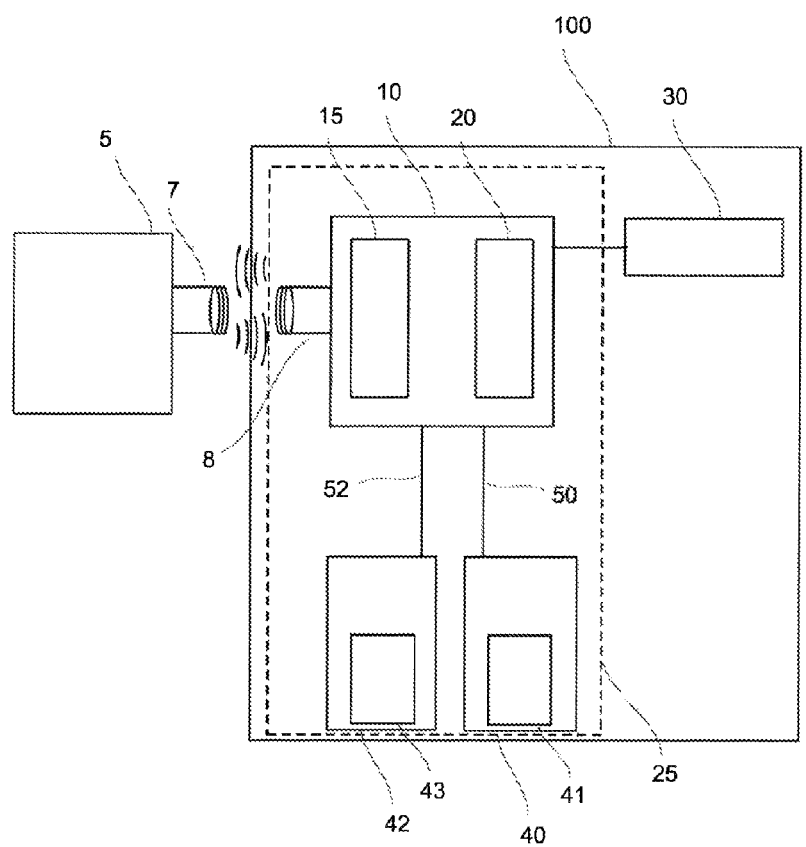
FIG. 1 shows a schematic illustration of a near field communication appliance incorporated in a terminal, based on exemplary embodiments of the invention.

The text below describes various embodiments of the invention, some of which are also illustrated by way of example in the figures. In the description of the figures which follows, identical reference symbols relate to components which are the same or similar. In general, only differences between various embodiments are described. In this context, features which are described as part of one embodiment can also readily be combined in connection with other embodiments in order to produce yet further embodiments.

Exemplary embodiments relate to a method for controlling the communication in an NFC terminal which comprises an NFC frontend and at least two secure elements. In this case, the assurance is provided that a communication arriving from an external appliance, for example a contactless terminal, is answered as far as possible without or with a small time offset by precisely that secure element from the plurality of secure elements present which has the application suited to or associated with the incoming communication. It is thus possible to address an application in one of a plurality of secure elements regardless of whether one or more secure elements are connected.

This selection or assurance of precisely targeted communication can be made in different ways based on exemplary embodiments. In this case, typically the standard transparency of the communication between the external appliance (that is to say a contactless NFC terminal, for example) and the NFC frontend (the interposed element) with a secure element can be interrupted at least for a short time, during which a decision or switch is made for the secure element which contains the application suited to the incoming communication and which can therefore be stipulated as the actual terminal point for the communication in the near field communication appliance. At the same time, the methods and appliances described in exemplary embodiments can usually be used to ensure that in this case the break in the transparency cannot be detected by the external appliance, that is to say that the course of the communication outwardly appears as if it were completely and consistently transparent.

The term "transparency" or "transparent connection" used herein is defined as follows. Based on exemplary embodiments, an interposed element, which is an NFC frontend in one implementation, for example, is a bridge between an external NFC terminal and the secure elements incorporated in the NFC appliance according to the invention or else a host component. Transparency is thus intended to be understood to mean that the NFC frontend merely performs the conversion of the RF information (that is to say in the 13.56 MHz band, for example) into digital information. In this case, the data stream coded in the RF communication (e.g. based on the ISO 14443 standard) or the bit sequence that is coded in is merely converted from the RF signal by the NFC frontend, that is to say by means of analog-to-digital conversion. The resulting bit sequence is then forwarded to the transparently linked secure element without further alteration or significant delay. This is what is intended to be understood by "transparency" or "transparent connection of interposed element and secure element" within the context of this specification.

An example of a break in the transparency is when the decoded bit stream is buffer-stored or buffered in the interposed element for a defined, significant period of time, for example, that is to say is essentially not forwarded in real time. In this case, one of the conditions surrounding whether or not the connection between the interposed element and a secure element can be regarded as transparent can be defined herein as follows. When the period of time for the delay between the reception of a first, RF-modulated bit by the interposed element and the forwarding of the bit is longer than the period of time which is required for calculation based on the input bit rate for the transmission of a byte, the connection can no longer be regarded as transparent by definition. In other words, transparency is meant to involve the "residence time" of a bit in the interposed element being shorter than or no more than equal to a period of time which is equivalent based on the input data rate for transmitting a byte. In this context, significant changes in the bit sequence, for example as a result of a change in the coding method owing to decoding and subsequent recoding, are also deemed a break in the transparency. Short, systematic time delays, for example as a result of an interposed shift register in the digital path, should not be considered to be a break in the transparency, on the other hand. In principle, a break in the transparency is indicated by all bit-oriented operations on the decoded data stream which go beyond the above.

The concept described above, of linking the incoming communication to the suitable secure element transparently toward the outside, with the transparency of the communication being able to be broken internally, is achieved in multiple variants based on proposed exemplary embodiments. In this context, the expression "deactivation of an interface" used herein does not necessarily mean that this interface needs to be disconnected or deactivated completely. By way of example, it may suffice for a status of the interface to be set to "off" or "inactive" by a control unit, such as the interposed element. Appropriate methods and definitions are well known to a person skilled in the art.

Based on exemplary embodiments, an interface between a first secure element and an NFC frontend is interrupted or deactivated when the application addressed by the external communication is not located or hosted on the first secure element. In the case of a contact-based interface between an NFC frontend and a secure element, which interface implements the contactless protocol based on ISO 14443 2/3/4, this may involve the following. Initially, the communication between the external terminal and the first secure element is transparent as standard, which means that all data coming from the RF interface of the NFC frontend are routed directly to the secure element and vice-versa, and in the outgoing case are sent on from there to the external terminal. Following reception of the "select application identifier" command, the NFC frontend—which to this end interrupts the transparent communication—detects and identifies whether or not the application addressed by the incoming external communication is hosted on the active first secure element. If this is not the case, the NFC frontend interrupts the connection via the interface or deactivates the interface to this secure element before the secure element can respond to the request. The frontend then undertakes the communication and/or transfers it to another secure element or another application host.

The methods cited above can also be combined with further methods for power management which are described below. In this context, an NFC frontend typically controls the operating state of the connected secure elements, which means that typically only the secure elements with which communication is taking place or imminent are in a switched on state in a type of time slot method.

FIG. 1 shows an apparatus based on exemplary embodiments. A terminal 100 with an NFC capability comprises an NFC appliance (near field communication appliance) 25 which has an NFC frontend 10 (also: contactless frontend, CLF, or NFC modem). This is an interposed element, as a bridge or hub, in the communication between an external NFC terminal/reader 5 and a plurality of secure elements 40, 42, at least one of which has or hosts an application. Each of the secure elements 40, 42 has a coding/decoding unit 41, 43 and is connected to the NFC frontend by means of wired interfaces 50, 52.

Figure 5:
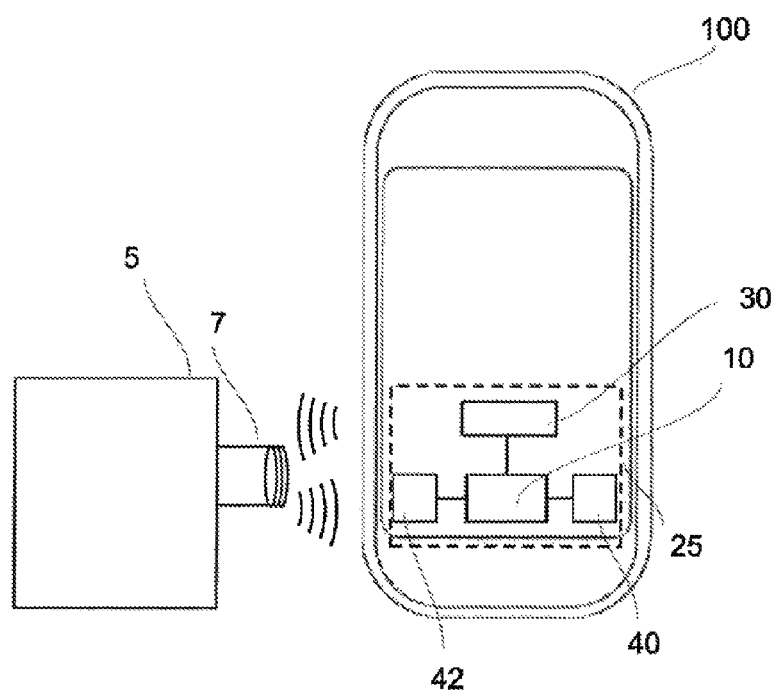
FIG. 5 shows a terminal based on exemplary embodiments.

Based on exemplary embodiments, the NFC frontend 10 with its analog RF interface 15 and an encoder/decoder unit 20 together with the secure elements 40, 42 and a host component 30 is part of a terminal 100 with NFC capability (shown only schematically in FIG. 1, in this regard see also FIG. 5). The secure elements 40, 42 typically each comprise an encoder/decoder unit 41, 43. The terminal 100 may be based on a multiplicity of mobile or fixed terminals, as listed at the outset. By way of example, these include mobile telephones, portable media players, smartphones, personal digital assistants (PDAs), handheld games consoles, tablet computers, laptop computers, consumer electronics, cards, tags, signs, posters or household appliances. In this context, the host component 30 is representative and a simplified version of all of the electronics hardware and software which the terminals 100 contain besides the NFC-related part. FIG. 1 also shows an external terminal 5 or contactless reader which can make contact with the near field communication appliance based on embodiments via respective RF antennas 7, 8.

Figure 2:
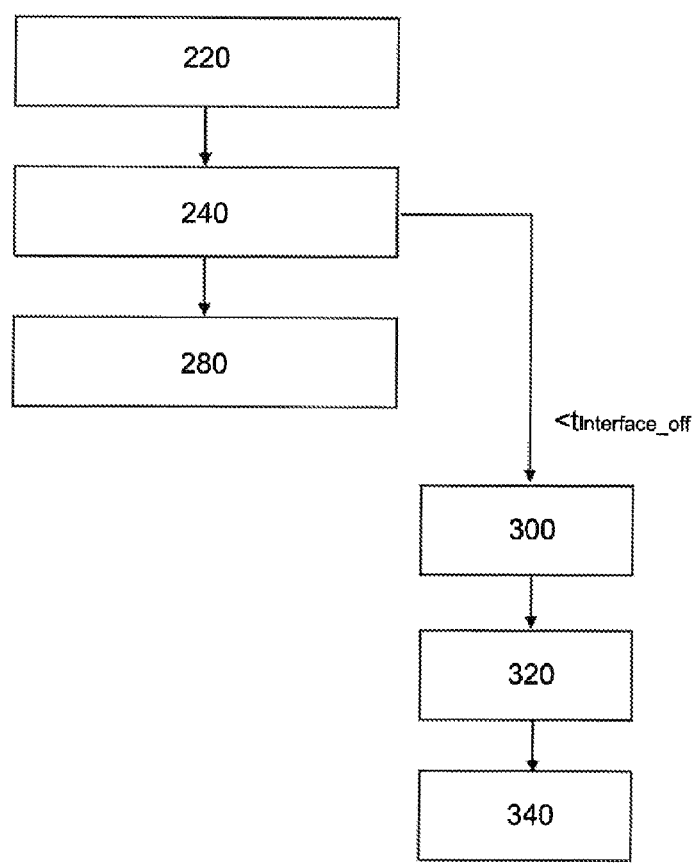
FIG. 2 schematically shows a method based on exemplary embodiments of the invention.

FIG. 2 schematically shows the processes based on the method 200 according to exemplary embodiments which takes place in an appliance in FIG. 1. As standard, the RF interface 15 (see FIG. 1) works transparently in an initial block 220, with forwarding of externally incoming communication to a particular secure element 40, 42. In order to determine the application suited to an incoming first communication in one of the secure elements 40, 42, the request ("select AID") coming from an external appliance 5 is buffered or buffer-stored in the NFC frontend 10 (block 240), and a test is performed to determine whether the application suited to the AID command is contained in the currently or initially connected secure element 40, 42. If this test is positive, this first secure element 40, 42 continues to process the external query (block 280). However, if the NFC frontend 10 establishes that the application suited to the first communication coming from the outside is not located on the currently connected secure element 40, 42, the NFC frontend 10 deactivates the interface 50, 52 to this secure element 40, 42 no later than after the time period $T_{interface\_off}$ (block 300). This prevents a negative response (typically "not acknowledged") from being routed from the first secure element 40 42, which does not contain the addressed application, to the RF interface 15, and hence on to the external NFC appliance 5. Following the deactivation of the interface, the NFC frontend 10 identifies the correct secure element 40, 42 (block 320) which contains the application addressed by the buffer-stored AID command, and forwards the AID command to that secure element 40, 42 (block 340).

Figure 3:
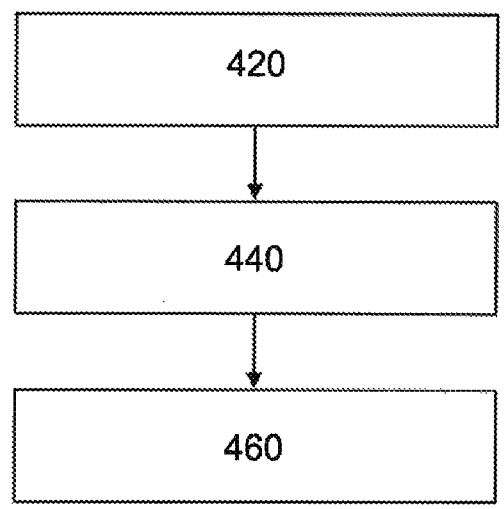
FIG. 3 schematically shows another method based on exemplary embodiments of the invention.

FIG. 3 shows a method 400 for controlling the flow of data in a near field communication appliance 25 having an interposed element 10 and a plurality of secure elements 40, 42 connected to the interposed element 10 based on exemplary embodiments. The method comprises receiving a first communication, sent by an external appliance 5, which is intended for an application that is located in one of a plurality of secure elements 40, 42 of the near field communication appliance 25 (block 420). The method further comprises determining whether a first secure element 40, 42 contains the addressed application (block 440), and deactivating an interface 50, 52 from the interposed element 10 to the first secure element 40, 42 if the first secure element 40, 42 does not contain the addressed application (a block 460).

Figure 4:
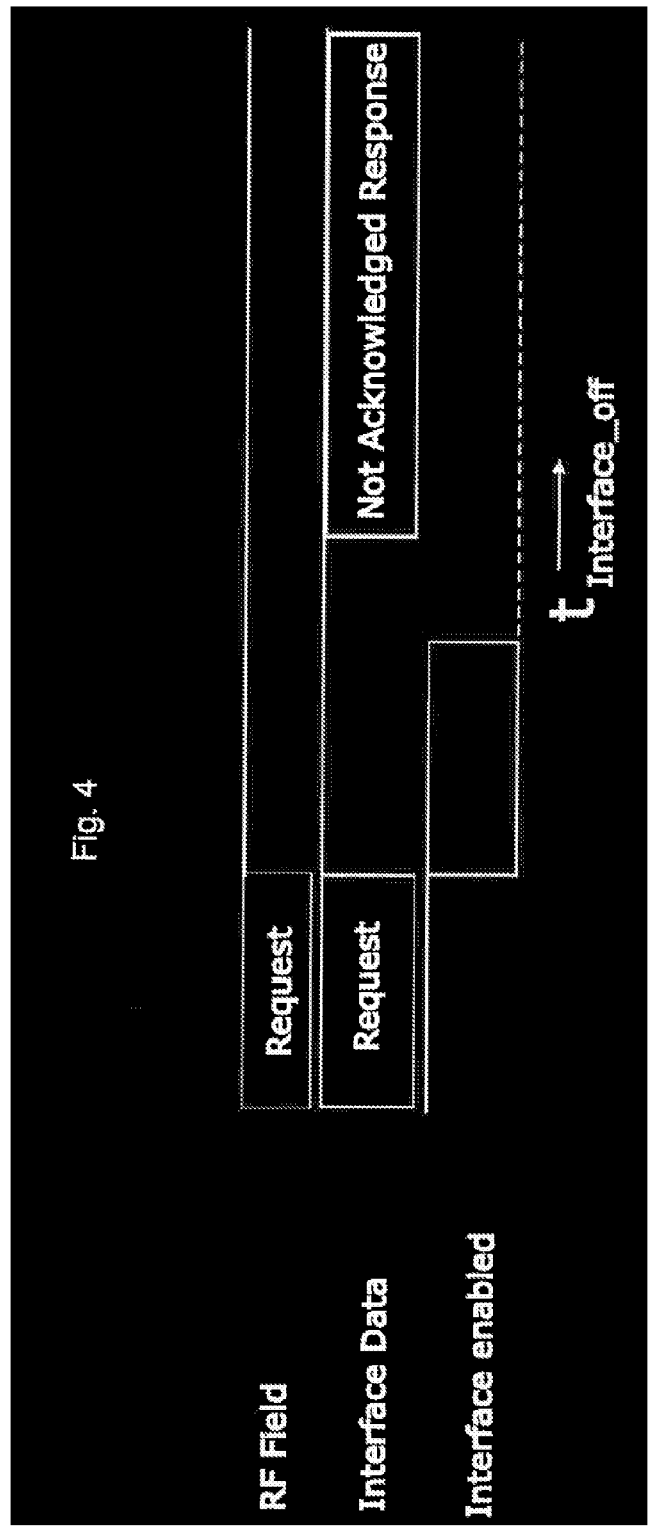
FIG. 4 shows a timing diagram based on exemplary embodiments.

A timing overview for a method based on exemplary embodiments is shown in FIG. 4. In the RF field, that is to say at the RF end of the interposed element, a request ("Request") is routed to a transparently connected secure element in a transparent manner or by a transparent interface as "Interface Data". If the secure element understands the request, but does not contain the application addressed in the request, a portion of the interface is switched off ("Interface Enable" set to zero), and hence the transparency is broken. A "Not acknowledged" response from this secure element is therefore rejected and not routed to the external appliance.

Based on exemplary embodiments, ISO 14443 layer 3 (the application layer) is handled by the secure element 40, 42. This requires at least one secure element 40, 42 to collect all the information about the layer 3 level from all of the secure elements 40, 42 present (in the example in FIG. 1, from itself, another and possibly one in the host component 30) before the RF communication with the external NFC appliance/terminal 5 begins. In this case, the NFC frontend 10 monitors/observes all externally arriving data in parallel or more or less simultaneously. If the NFC frontend 10 detects or identifies the "Select AID" command, it verifies whether a secure element 40, 42 is hosting the addressed application. If this check shows a positive result, the interface 50, 52 to the secure element 40, 42 in question continues to be active. If the check shows a negative result, the interface 50, 52 to the secure element 40, 42 in question is deactivated before the previously tested secure element 40, 42 can send a negative response ("not acknowledged").

In one variant, ISO 14443 layer 3 is handled by the NFC frontend 10 in this case. The two (in this nonlimiting example) secure elements 40, 42 are in this case initially set to the mode of the application layer. This can be accomplished either by virtue of layer 3 commands being sent by the NFC frontend 10 before the beginning of the RF communication with the external terminal 5, or by virtue of fundamental configuration of the secure elements 40, 42 in a manner such that the secure elements 40, 42 automatically start at the level of the application layer. Before the "Select AID" command, the NFC frontend 10 activates the interface 50, 52 to a secure element 40, 42. The NFC frontend 10 then verifies whether this secure element 40, 42 is hosting the addressed application. If so, this secure element 40, 42 continues executing the relevant application. If the secure element 40, 42 does not contain the application, the NFC frontend 10 deactivates the interface 50, 52 to this secure element 40, 42, and the communication is passed to another secure element 40, 42. Finally, successful identification of the secure element 40, 42 with the addressed application is followed by the communication being switched to the transparent mode again by means of the interfaces 50, 52.

In exemplary embodiments, the above methods and appliances may also be combined with methods for power management. This means that a central unit, in this case typically the NFC frontend 10, to which other appliances are connected, can be switched on and off or put into an idle state in a targeted manner in order to control whether communication with these appliances is at all possible at a particular time. This consequently affords an elegant solution for an NFC frontend to simultaneously control communication and lower power consumption. Switching on in a time slot method thus makes it possible to ensure that only the secure element(s) which is/are currently required is/are ever switched on, consuming current and able to communicate.

Since the induced current is limited, care should be taken to ensure that only the absolutely necessary number of elements is active. Based on timeout times, which may be different for different commands, the corresponding secure element can be made to change its power consumption. The NFC frontend needs to take into account the timeout time in this case before a further secure element is activated. The NFC frontend can also cut off the power supply for particular secure elements after particular timeouts for example if this secure element is not required for a foreseeable time.

FIG. 5 shows a mobile terminal 100, in this case a smartphone, with a near field communication appliance or system 25 according to ISO 14443 based on exemplary embodiments. In embodiments, the mobile terminal 100 may be, inter alia, a portable media player, a smartphone, a personal digital assistant (PDA), a handheld games console, a tablet computer, a smart card, a personal computer, particularly a laptop, or another of the terminals mentioned in this specification.

Figure 6:
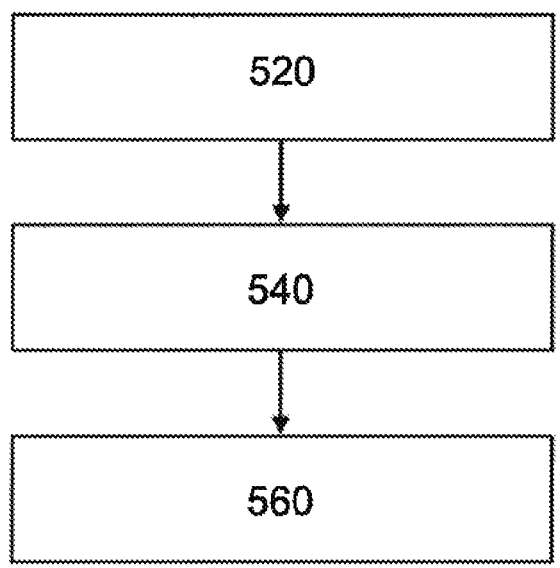
FIG. 6 shows a further method based on exemplary embodiments.

FIG. 6 shows a method 500 based on exemplary embodiments for controlling the flow of data in a near field communication appliance having an interposed element and a plurality of secure elements. The method 500 comprises receiving a first communication, sent by an external appliance, which is intended for an application located in one of the secure elements (block 520), and determining which of the secure elements contains the application (in block 540). The method further comprises taking measures to ensure that a further communication takes place exclusively between the external appliance and the secure element which contains the addressed application (in block 560).

A person skilled in the art will readily understand that not only can the method based on embodiments that is described here be performed in the variants described in detail, it can also, in principle, be used for a multiplicity of applications. In particular, it is suitable for electronic appliances implemented on the basis of a standard which are intended to have the standard data communication between appliances or elements speeded up.

Terms such as "first", "second", and the like, are used to describe various elements, regions, sections, etc. and are not intended to be limiting. Like terms refer to like elements throughout the description.

As used herein, the terms "having", "containing", "including", "comprising" and the like are open-ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A method for controlling the flow of data in a near field communication appliance having an interposed element and a plurality of secure elements connected to the interposed element, the method comprising:
    receiving a first communication, sent by an external appliance, which is intended for an application located in one of the secure elements;
    determining whether a first one of the secure elements contains the application; and
    deactivating an interface from the interposed element to the first secure element if the first secure element does not contain the application.

2. The method of claim 1, wherein the first secure element begins communication with the external appliance if the first secure element contains the application.

3. The method of claim 1, wherein the interposed element determines whether the first secure element contains the application, and wherein the interposed element forwards the first communication to a second one of the secure elements if the first secure element does not contain the application.

4. The method of claim 1, wherein the interposed element deactivates the interface no later than after a defined time tInterface off if the first secure element does not contain the application.

5. The method of claim 1, further comprising buffer-storing the first communication in the interposed element.

6. The method of claim 1, further comprising beginning a transparent communication between the external appliance and the secure element which contains the application.

7. The method of claim 1, wherein the external appliance is an NFC reader and the near field communication appliance is a mobile terminal with an NFC function.

8. The method of claim 1, wherein the interposed element is an NFC frontend.

9. The method of claim 1, further comprising measuring in order to prevent data collisions between the secure elements by using targeted power management.

10. The method of claim 1, wherein the communication between the external appliance and the near field communication appliance is based on ISO 14443.

11. The method of claim 10, wherein information at a level of ISO 14443 layer 3 is handled by one of the secure elements or by the interposed element.

12. A near field communication system, comprising:
a near field communication appliance, comprising:
a plurality of secure elements; and
an interposed element connected to the secure elements,
wherein the near field communication appliance is operable to:
receive a first communication, sent by an external appliance, which is intended for an application located in one of the secure elements;
determine whether a first one of the secure elements contains the application; and
deactivate an interface from the interposed element to the first secure element if the first secure element does not contain the application.

13. The near field communication system of claim 12, wherein the first secure element is operable to begin communication with the external appliance if the first secure element contains the application.

14. The near field communication system of claim 12, wherein the interposed element is operable to determine whether the first secure element contains the application and forward the first communication to a second one of the secure elements if the first secure element does not contain the application.

15. The near field communication system of claim 12, wherein the interposed element is operable to deactivate the interface no later than after a defined time $t_{Interface\_off}$ if the first secure element does not contain the application.

16. The near field communication system of claim 12, wherein the near field communication appliance is further operable to buffer-store the first communication in the interposed element.

17. The near field communication system of claim 12, wherein the near field communication appliance is further operable to begin a transparent communication between the external appliance and the secure element which contains the application.

18. The near field communication system of claim 12, wherein the external appliance is an NFC reader and the near field communication appliance is a mobile terminal with an NFC function.

19. The near field communication system of claim 12, wherein the near field communication system is a mobile terminal.

* * * * *